(12) United States Patent
Durali et al.

(10) Patent No.: US 9,493,595 B2
(45) Date of Patent: Nov. 15, 2016

(54) VINYLIDENE FLUORIDE COPOLYMERS

(75) Inventors: Mehdi Durali, Carlsbad, CA (US); David A. Mountz, Exton, PA (US)

(73) Assignee: Arkema Inc., King of Prussia, PA (US)

( * ) Notice: Subject to any disclaimer, the term of this patent is extended or adjusted under 35 U.S.C. 154(b) by 142 days.

(21) Appl. No.: 13/001,909

(22) PCT Filed: Jun. 18, 2009

(86) PCT No.: PCT/US2009/047768
§ 371 (c)(1),
(2), (4) Date: Dec. 29, 2010

(87) PCT Pub. No.: WO2010/005755
PCT Pub. Date: Jan. 14, 2010

(65) Prior Publication Data
US 2011/0111156 A1    May 12, 2011

Related U.S. Application Data

(60) Provisional application No. 61/078,483, filed on Jul. 7, 2008.

(51) Int. Cl.
*B32B 1/08* (2006.01)
*C08F 214/22* (2006.01)
*C08F 214/18* (2006.01)
*C09D 127/16* (2006.01)

(52) U.S. Cl.
CPC ......... *C08F 214/22* (2013.01); *C08F 214/182* (2013.01); *C09D 127/16* (2013.01); *Y10T 428/139* (2015.01)

(58) Field of Classification Search
CPC .... C08F 214/22; C08F 14/18; C09D 127/12; C09D 127/16; Y10T 428/13; Y10T 428/1352; Y10T 428/139; Y10T 428/421
USPC .......... 428/36.9, 36.91, 39.92; 526/242, 243, 526/244, 245, 246, 247, 248, 249, 250, 251, 526/252, 253, 254, 255; 524/544, 545, 546
See application file for complete search history.

(56) References Cited

U.S. PATENT DOCUMENTS

| 4,141,874 | A | | 2/1979 | Oka et al. |
| 4,615,943 | A | * | 10/1986 | Sakagami et al. ............ 428/332 |
| 5,140,082 | A | * | 8/1992 | Watanabe et al. ............ 526/255 |
| 6,649,720 | B2 | * | 11/2003 | Amin-Sanayei et al. .... 526/255 |
| 7,521,514 | B2 | | 4/2009 | Lyons |
| 2003/0065132 | A1 | | 4/2003 | Bauerle et al. |
| 2007/0106010 | A1 | * | 5/2007 | Hedhli et al. ................. 524/544 |
| 2007/0232769 | A1 | | 10/2007 | Lyons |

FOREIGN PATENT DOCUMENTS

| EP | 04560192 B2 * | 5/2004 | ............ C08F 214/08 |
| JP | 2000-178321 | 6/2000 | |

* cited by examiner

*Primary Examiner* — Lee Sanderson
(74) *Attorney, Agent, or Firm* — Thomas F. Roland

(57) ABSTRACT

The invention relates to a copolymer composition of poly (vinylidene fluoride-trifluoropropene) copolymers. The copolymers formed have excellent optical properties, with very low haze, as well as high melting points, excellent flexibility and toughness.

8 Claims, 4 Drawing Sheets

FIGURE 1

VDF-TFP copolymers offer a combination of high melting temperatures and low crystallinities.

*FIGURE 2*

Melt point comparison between VDF-TFP and VDF-HFP copolymers

FIGURE 3

Optical clarity differences between VDF-TFP and VDF-HFP copolymers

Lowest TFP content (~3%) shows similar optical clarity as 18% HFP copolymer.
The measurements were done on 3 mm plaques.

FIGURE 4

VINYLIDENE FLUORIDE COPOLYMERS

FIELD OF THE INVENTION

This invention relates to a copolymer composition of poly(vinylidene fluoride-3,3,3 trifluoropropene) copolymers. The copolymers formed have excellent optical properties, with very low haze.

BACKGROUND OF THE INVENTION

Polyvinylidene fluoride (PVDF) is a chemically resistant engineering plastic. PVDF and its copolymers have been used in many high performance applications. While PVDF films can be made to be transparent, they still have some degree of haziness, producing a product that is less than optically clear. There is a need for an optically clear PVDF or PVDF copolymer that retains the chemical resistance of PVDF U.S. Pat. No. 5,140,082 discloses a vinylidene fluoride/ trifluoromethyl ethylene copolymer (3,3,3-trifluoropropene) (TFP). Synthesis by bulk, solution, suspension and emulsion polymerization are described, with all the TFP in the initial charge. The copolymer has excellent weather resistance, corrosion resistance and electrical characteristics. The reference is silent on optical clarity.

US 2007/0232769 describes the emulsion polymerization of a copolymer of tetrafluoroethylene (TFE) and TFP. The copolymer is produced in a semi-batch process, with most or all of the TFP is added as a delayed feed, and the copolymer produced has excellent processability. The reference is silent on optical clarity.

Surprisingly it has been found that copolymers of vinylidene fluoride and 3,3,3-trifluoropropene can be synthesized by a semi-batch emulsion polymerization process, with the copolymers produced having excellent optical properties. Additionally films of the copolymer are extremely flexible and tough, and have a high melting point.

SUMMARY OF THE INVENTION

The invention relates to a copolymer composition having 0.5 to 40 weight percent of 3,3,3-trifluoropropene monomer units and 60 to 99.5 weight percent of vinylidene fluoride monomer units. The copolymer composition is optically clear.

The invention also relates to a vinylidene fluoride having a melting point of greater than 150° C., and a crystallinity of less than 23 percent.

DETAILED DESCRIPTION OF THE INVENTION

The invention relates to vinylidene fluoride-3,3,3 trifluoropropene (VDF-TFP) copolymers containing from 0.5%-40 wt. % TFP. The copolymer is optically clear.

By "optically clear" as used herein means a material having a haze level of less than 30.0% when measured by ASTM D1003-07 Standard Test Method for Haze and Luminous Transmittance of Transparent Plastics, and a light transmission of >85%, and preferably greater than 90 percent, when measured by ASTM D1003-07.

By "copolymer" as used herein is meant a polymer containing 0.5 to 40 weight percent of TFP monomer units and from 60 to 99.5 weight percent of vinylidene fluoride monomer units. Preferably the level of TFP is from 2-14 weight percent, and more preferably from 7 to 10 weight percent. True copolymers, containing only TFP and VDF are preferred. However, low levels (up to 20 weight percent and preferably up to 10 weight percent) of one or more other copolymerizable monomers may be present. These copolymerizable monomers include, but are not limited to tetrafluoroethylene, trifluoroethylene, chlorotrifluoroethylene, hexafluoropropene, vinyl fluoride, 2,3,3,3 tetrafluoropropene, pentafluoropropene, perfluoromethyl vinyl ether, and perfluoropropyl vinyl ether.

The VDF/TFP copolymer useful in the invention can be homogeneous or heterogeneous, and may have any architecture, including but not limited to random, block, tapered, linear, branched, star and comb.

The VDF/TFP copolymers can be made by any polymerization method as long as a semi-batch approach is taken, with most or all of the TFP added to the reactor after the start of polymerization. Feeding TFP in a batch mode severely inhibits polymerization reaction.

Preferably, the copolymers are made by a semi-batch emulsion process. A typical semi-batch emulsion polymerization process of the invention consists of the following steps:

(a) A reactor is charged with deionized water, optionally a surfactant optionally an antifoulant, optionally a buffering agent, and optionally a molecular weight regulator in any convenient order to form an aqueous mixture.

(b) Air is removed from the reactor;

(c) Heat and agitation sufficient to effect polymerization are provided;

(d) The reactor is brought to reaction pressure with the initial gaseous monomer mixture consisting of 60 to 100 weight percent of vinylidene fluoride and 10 to 0 weight percent of trifluoropropene and 0-30 weight percent of other fluoromonomers Preferably all TFP is added in the delay feed. It was observed that TFP in the initial charge made the polymerization difficult to initiate. With levels of TFP over 10 mole percent, no reaction occurred, and at a 10 mole percent TFP in the initial charge, it took over two and half hours to initiate the reaction.

(e) A radical initiator is added to begin the polymerization;

(f) The polymerization is continued by feeding a mixture of the remaining vinylidene fluoride and trifluoropropene to maintain reaction pressure as desired, and additional initiator, heat, and agitation are used as needed to continue the progress of reaction; In general, the feed of the comonomers is keep at a constant rate, and the ratio of the VDF to TFP is kept about constant throughout the feed. It is within the scope of the invention to vary either the ratio of the monomers throughout the feed, and to vary the rate of addition of the monomers. The delayed feed is preferably of a continuous nature, tough it could also consist of small additions of monomer at intervals. Care must be taken to feed the TFP monomer with VDF, as adding a large amount of TFP monomer at one time could severely inhibit polymerization (g) A post-feeding period may optionally be used to consume residual monomer after the monomer feeds are stopped. The post-feeding period may include some further additions of some reaction components, such as the addition of more radical initiator to help consume residual monomers;

(h) The reactor is vented of surplus gas;

(i) Any molecular weight regulator, buffering agent, and radical initiator may be added to the reactor at any time during the initial filling of the reactor, during the reaction, or during the post-feeding period, so that desired molecular weight profiles, acidity profiles, and process rates may be obtained. Removal of air, addition of surfactant, addition of antifoulant, the application of heat and agitation may optionally be at different points before the polymerization begins so that reaction start-up may be optimized for the equipment used;

(j) After the reaction is complete, the copolymer composition may be used in the form of a latex or the composition may optionally be isolated from the remainder of the reaction mixture by known separation methods such as by coagulation, by mechanical separation, or by drying;

(k) Isolated copolymer composition may optionally be further purified, such as by washing, and dried to a powder, and optionally further processed into a convenient form such as into pellets.

(l) The copolymer composition may be used to form coatings, or be processed, such as by a melt process, into a sheet, film, profile, or final articles.

The temperature used for polymerization may vary from 20-160 degrees Celsius, depending on the initiator system chosen. The polymerization temperature is preferably from 35-130 degrees Celsius, and most preferably from 65-130 degrees Celsius. In one embodiment, the temperature could be varied during the reaction.

The pressure used for polymerization may vary from 280–20,000 kPa, depending on the capabilities of the reaction equipment, the initiator system chosen, and the monomer selection. The polymerization pressure is preferably from 2,000–11,000 kPa, and most preferably from 2,750–6,900 kPa.

The polymerization occurs under stirring. The stirring may be constant, or may be varied to optimize process conditions during the course of the polymerization. In one embodiment, both multiple stirring speeds and multiple temperatures are used for controlling the reaction.

The reactor pressure is primarily regulated by controlling the feed of the gaseous monomer mixture to the reaction. The reaction pressure is typically from about 280 to about 20,000 kPa, preferably from about 2,000 to about 11,000 kPa, more preferably from about 2,750 to about 6,900 kPa.

Surfactant

Surfactants useful in the invention include halogenated and non-halogenated surfactants known to be useful for the polymerization of vinylidene fluoride. Examples of useful surfactants are fluorinated and perfluorinated carboxylic acid salts; siloxane surfactants; 3-allyloxy-2-hydroxy-1-propanesulfonic acid salt surfactant; alkyl sulfonate surfactant; and perfluorinated ether carboxylic acids and their salts. Other non-fluorinated surfactants include those described in U.S. patent application Ser. Nos. 10/832,535; 11/149,797; 60/706,463; and 60/706,464. The surfactant charge is from 0.05% to 2% by weight on the total monomer weight used, and most preferably the surfactant charge is from 0.1% to 0.2% by weight. Normally the surfactant is added during the initial filling of the reactor, but it may also be added after the reaction has begun if an initiator system is chosen that provides some emulsion stabilization by itself. Surfactant may also be added as the reaction progresses if needed for further stabilization.

In one preferred embodiment, the copolymer of the invention is made without any surfactant. Very stable emulsions of up to 38 percent solids have been synthesized without the use of any surfactant. Stable surfactant-free emulsions can have advantages in applications where the presence of surfactant may have a detrimental effect on final properties.

Initiators

The term "initiator" and the expressions "radical initiator" and "free radical initiator" refer to a chemical that is capable of providing a source of free radicals, either induced spontaneously, or by exposure to heat or light. Examples of initiators include peroxides, peroxydicarbonates and azo compounds. The term expression also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is from about 0.002 to about 1.0 weight percent.

The radical initiator may comprise an organic peroxide such as an alkyl, dialkyl, or diacyl peroxide, peroxydicarbonate, and peroxy ester in an amount from about 0.5 to about 2.5 weight percent on total monomer.

Chain-Transfer Agents

Chain-transfer agents are added to the polymerization to regulate the molecular weight of the product. They may added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or pK$_b$ value in the range of from about 4 to about 10, preferably from about 4.5 to about 9.5. Preferred buffering agents in the practice of the invention include, for example, phosphate buffers and acetate buffers. A "phosphate buffer" is a salt or salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction.

Antifoulant

The addition of a paraffin wax or hydrocarbon oil to the reaction serves as an antifouling to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

Generally, the latex contains from about 10 to about 50 weight percent copolymer solids. The copolymer in the latex is in the form of small particles having a size range of from about 30 nm to about 500 nm.

The product of the polymerization is a latex which can be used as a latex, usually after filtration of solid byproducts from the polymerization process, or which can be coagulated to isolate the solids, which may then be washed and dried. For use in latex form, the latex can be stabilized by the addition of further surfactant, which may be ionic surfactants, or may be of other types, such as an non-ionic surfactant. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules.

The copolymers of the invention have a weight average molecular weight of from 50,000 to 1,000,000.

The VDF/TFP copolymers of the invention have unique properties, which can be exploited in many applications. The copolymers of the invention have excellent optical clarity, high melting points, a high proportion of beta-phase crystals, high flexibility, decreased crystallinity and density with an increase in TFP content.

High optical clarity of the VDF/TFP copolymers is seen over a wide composition range. The light transmission is greater than 85 percent, preferably greater than 90%, and more preferably greater than 95 percent as measured by ASTM D1003-07. In particular, films having a very lower level of haze are produced. A haze of less than 30.0 percent and preferably less than 24.0 percent, and most preferably less than 10 percent is found for the compositions using ASTM D1003-07.

The copolymers of the invention have high melting points. Following a drop of melt point at low TFP concentrations (up to 3-5 wt %) the melting temperature increases with increasing TFP concentration. This behavior is unlike VDF-hexafluoropropene (HFP) copolymers where melt point drops with increasing HFP over the entire composition range. In addition to the high melting points, the copolymers have a high thermal stability, and excellent melt strength.

The VDF/TFP copolymers of the invention have a high proportion of beta-phase crystals over the range of TFP concentrations. The beta-phase crystals will make up at least 50 weight percent of the copolymer, and preferably at least 75 weight percent. At levels of TFP of 30 weight percent, nearly all of the crystals are in the beta form. Polyvinylidene fluoride homopolymers, and VDF-HFP copolymers only show alpha crystals. The high concentration of beta crystals leads to useful electrical properties.

As the TFP content of the copolymer increases, both overall crystallinity and density are found to decrease.

The VDF/TFP copolymers have excellent flexibility, with the flexibility increasing with increased TFP levels. The flexibility is achieved while maintaining high melting temperatures. By "flexible" and excellent "flexibility" as used herein means a tensile modulus of less than or equal to 50,000 psi.

Additionally, the VDF/TFP copolymer of the invention has good stress hardening—better than a PVDF homopolymer. The films can be stretched without loss of optical clarity.

The VDF-TFP copolymers provide a combination of high melting temperature and low crystallinity. In one embodiment melting points of greater than 150° C. are associated with a crystallinity of less than 23 percent.

The unique properties of the VDF/TFP copolymers makes them excellent candidates for many applications. One of skill in the art could imagine many uses, based on the list of properties and examples provided in this application. Some useful application include, but are not limited to:

1. High clarity films. The films could be placed over lenses and other optical equipment to provide excellent chemical protection and dirt-shedding.
2. High temperature flexible clear tubes. Since the melting point of the copolymers is high compared with VDF-HFP copolymers, it could be used in applications requiring high heat in processing or end-use.
3. Similarly, the high melting point, optical clarity and chemical resistance make these copolymers ideal for clear see-through industrial windows, glasses, pipes, and level indicators
4. Specialty films, such as for solar panels, piezoelectric, and capacitor applications.
5. Fuel cell membranes. They have similar mechanical properties to VDF-HFP copolymers, while maintaining a higher melting point that is useful for resistance to creep in the electrode assembly.
6. Clear, tough coatings.
7. Tough films and large blown objects, due to the high melt strength of the copolymer.

EXAMPLES

Comparative Example According to the Teachings of U.S. Pat. No. 5,140,082

To a 7.6 liter, stainless steel reactor was added 3800 ml of Deionized water, 3.0 g of ammonium persulfate and 15 g of ammonium perfluorooctanoate. The mixture was purged with argon and agitated for 0.5 hours. The reactor was sealed, agitation was continued, and the reactor was heated to 80 degrees Celsius. The reactor was charged with 0.380 kg 3,3,3 trifluoropropylene (TFP). Next, vinylidene fluoride (VDF) was fed into the reactor to bring reactor pressure to 51.7 kg/cm$^2$. The reactor temperature was then stabilized at 80 degrees Celsius. No sign of reaction and drop in reactor pressure was observed. After 6.0 hours of inactivity, reactor was cooled to 30 degrees Celsius, surplus gas was vented, and the reactor was drained. No sign of polymerization was observed and the material discharged from the reactor appeared as clear as water.

Example 2 (of the Invention)

To a 7.6 liter, stainless steel reactor was added 4.430 kg of water, and 0.004 kg of paraffin wax. The mixture was purged with argon and agitated for 0.5 hours. The reactor was sealed, agitation was continued, and the reactor was heated to 110 degrees Celsius. The reactor was charged with 0.374 kg of vinylidene fluoride, 0.016 kg 3,3,3 trifluoropropylene, and 10.0 g of pure ethyl acetate. The reactor temperature stabilized at 110 degrees Celsius, with the reactor pressure at 4510 kPa. An aqueous initiator solution 2.0 wt. % in potassium persulfate and 1.4 wt. % in sodium acetate was charged at a rate of about 0.48 kg/h until 0.06 kg initiator solution was in the reactor. At such point initiator feed rate was dropped to 0.06 kg/hr. The reaction temperature was held at 110 degrees Celsius, and the reaction pressure was maintained at 4480 kPa by adding as needed vinylidene fluoride, and 3,3,3 trifluoropropylene in a ratio of about 1/0.045, respectively. After 1.28 hours, the initiator feed rate was dropped to 0.042 kg/hr and after 1.58 hours, the initiator feed rate was dropped to 0.03 kg/hr and maintained at this rate for the rest of the reaction. After 2.75 hours, the feeds of vinylidene fluoride, and 3,3,3 trifluoropropene were stopped. An amount of vinylidene fluoride, 1.852 kg, and of 3,3,3 trifluoropropene, 0.089 kg had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. Negligible coagulum had formed during the reaction. Gravimetric solids measurements of the latex showed the solid polymer yield to be 99.8 wt. % based on the total combined weight of the vinylidene fluoride and 3,3,3 trifluoropropene monomers which were fed to the reactor.

Example 3 (of the Invention)

To a 7.6 liter, stainless steel reactor was added 4.430 kg of water, and 0.004 kg of paraffin wax. The mixture was purged with argon and agitated for 0.5 hours. The reactor was sealed, agitation was continued, and the reactor was heated to 110 degrees Celsius. The reactor was charged with 0.358 kg of vinylidene fluoride, 0.018 kg 3,3,3 trifluoropropylene, and 6.0 g of pure ethyl acetate. The reactor temperature stabilized at 110 degrees Celsius, with the reactor pressure at 4510 kPa. An aqueous initiator solution 2.0 wt. % in potassium persulfate and 1.4 wt. % in sodium acetate was charged at a rate of about 0.48 kg/h until 0.06 kg initiator solution was in the reactor. At such point initiator feed rate was dropped to 0.06 kg/hr. The reaction temperature was held at 110 degrees Celsius, and the reaction pressure was maintained at 4480 kPa by adding as needed vinylidene fluoride, and 3,3,3 trifluoropropylene in a ratio of about 1/0.1, respectively. After 2.8 hours, the initiator feed rate was dropped to 0.03 kg/hr and maintained at this rate for the rest of the reaction. After 3.77 hours, the feeds of vinylidene fluoride, and 3,3,3 trifluoropropene were stopped. An amount of vinylidene fluoride, 1.854 kg, and of 3,3,3 trifluoropropene, 0.170 kg had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. Negligible coagulum had formed during the reaction. Gravimetric solids measurements of the latex showed the solid polymer yield to be 99.1 wt % based on the total combined weight of the vinylidene fluoride and 3,3,3 trifluoropropene monomers which were fed to the reactor.

Example 4 (of the Invention)

To a 7.6 liter, stainless steel reactor was added 4.430 kg of water, and 0.004 kg of paraffin wax. The mixture was purged with argon and agitated for 0.5 hours. The reactor was sealed, agitation was continued, and the reactor was heated to 110 degrees Celsius. The reactor was charged with 0.384 kg of vinylidene fluoride, and 6.0 g of pure ethyl acetate. The reactor temperature stabilized at 110 degrees Celsius, with the reactor pressure at 4510 kPa. An aqueous initiator solution 2.0 wt. % in potassium persulfate and 1.4 wt. % in sodium acetate was charged at a rate of about 0.48 kg/h until 0.06 kg initiator solution was in the reactor. At such point initiator feed rate was dropped to 0.12 kg/hr and kept at this rate throughout the run. The reaction temperature was held at 110 degrees Celsius, and the reaction pressure was maintained at 4480 kPa by adding as needed vinylidene fluoride, and 3,3,3 trifluoropropylene in a ratio of about 1/0.1, respectively. After 2.9 hours, the feeds of vinylidene fluoride, and 3,3,3 trifluoropropene were stopped. An amount of vinylidene fluoride, 1.850 kg, and of 3,3,3 trifluoropropene, 0.144 kg had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. Negligible coagulum had formed during the reaction. Gravimetric solids measurements of the latex showed the solid polymer yield to be 98.1 wt % based on the total combined weight of the vinylidene fluoride and 3,3,3 trifluoropropene monomers which were fed to the reactor.

Example 5

Films were produced from the latex of Examples 2-4. Haze and transmittance were measured by ASTM D1003-07. The results are shown in Table 1.

TABLE 1

| Example | Film (microns) | % Haze | % transmission | TFP % | Tm (° C.) | Melt Viscosity (KP) |
|---|---|---|---|---|---|---|
| 1 (Comp) No polymer could be formed | | | | | | |
| 2 | 25 | 33.3 | 95.6 | 4.3 | 150 | 28.5 |
| 3 | 35 | 22.4 | 95.9 | 7.9 | 146 | 21.6 |
| 4 | 35 | 3.69 | 95.7 | 6.7 | 148 | 22.6 |

*Example 2 had poor film formation

As can be observed from the data, all compositions show a high degree of clarity evidenced by greater than 95% luminous transmittance. Example 4 has a haze value of below, 3.7 demonstrating the excellent optical clarity, and the advantages from using the present process for forming the copolymer.

Example 6

Figure 1:
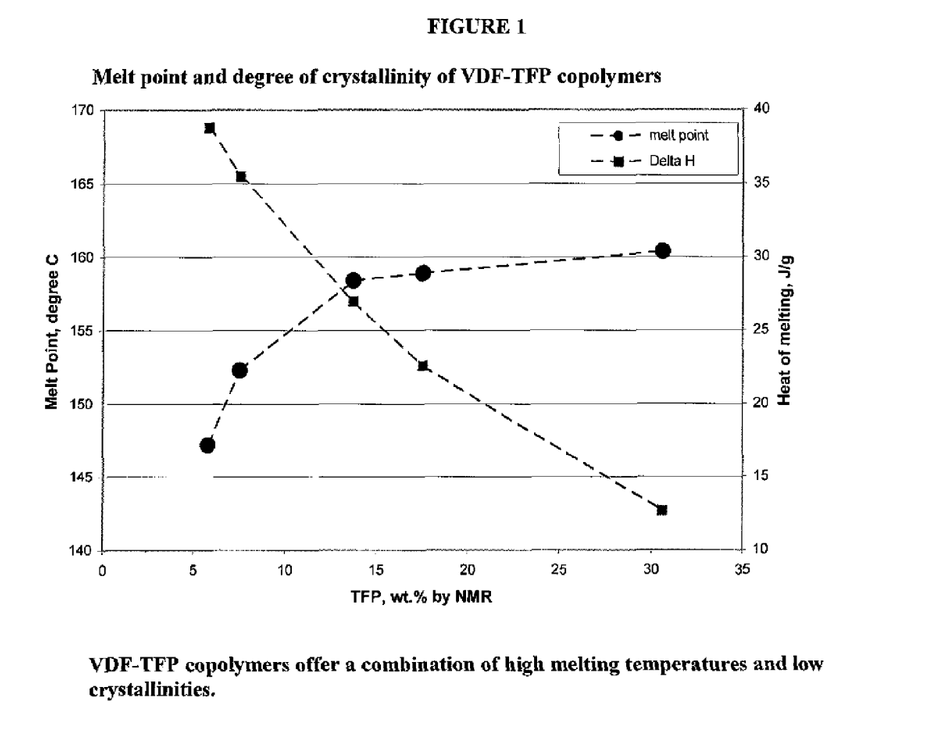
FIG. 1: A plot of the melting point and crystallinity of vinylidene fluoride (VDF)-TFP copolymers at differing levels of comonomers.

Copolymers of VDF and TFP were synthesized using the procedure of Example 4 except reaction temperature was set at 90 degrees Celsius. TFP level was varied to generate data points presented in the graph. The melt point and degree of crystallization, as measured by Differential Scanning Calorimeter (DSC) were plotted, and are shown in FIG. 1. It can be seen that melting temperature increases with increase in TFP content while heat of melting (measure of crystallinity) drops as TFP level increases.

Example 7

Figure 2:
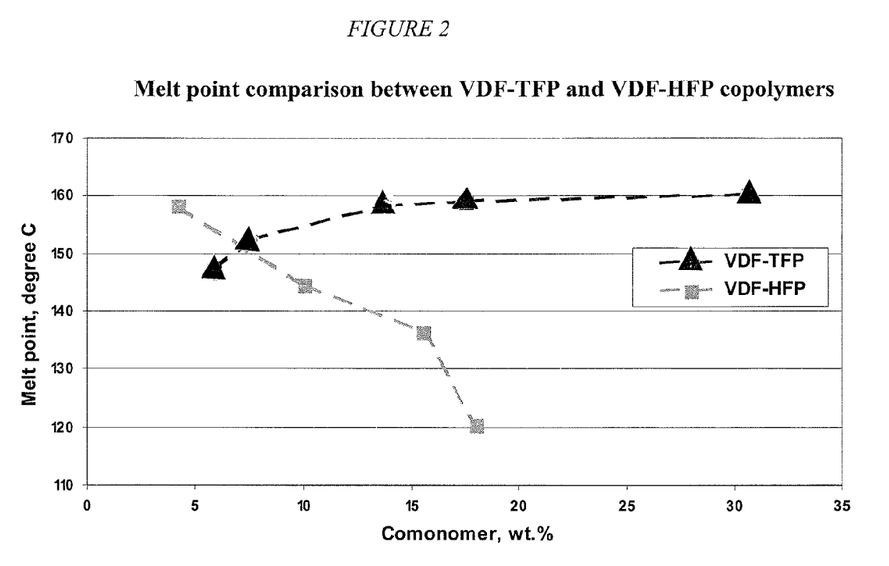
FIG. 2: A plot comparing the melting point of VDF-TFP copolymers with VDF-HFP copolymers at differing levels of comonomer.

Copolymers of VDF and TFP were synthesized using the procedure of Example 6, with differing levels of TFP (Examples 7a, b, c—see Table 2). The melting point (by DSC) was plotted in comparison to VDF-HFP commercial copolymers (Examples 7d, e from Arkema Inc.) as shown in FIG. 2.

Example 8

Figure 3:
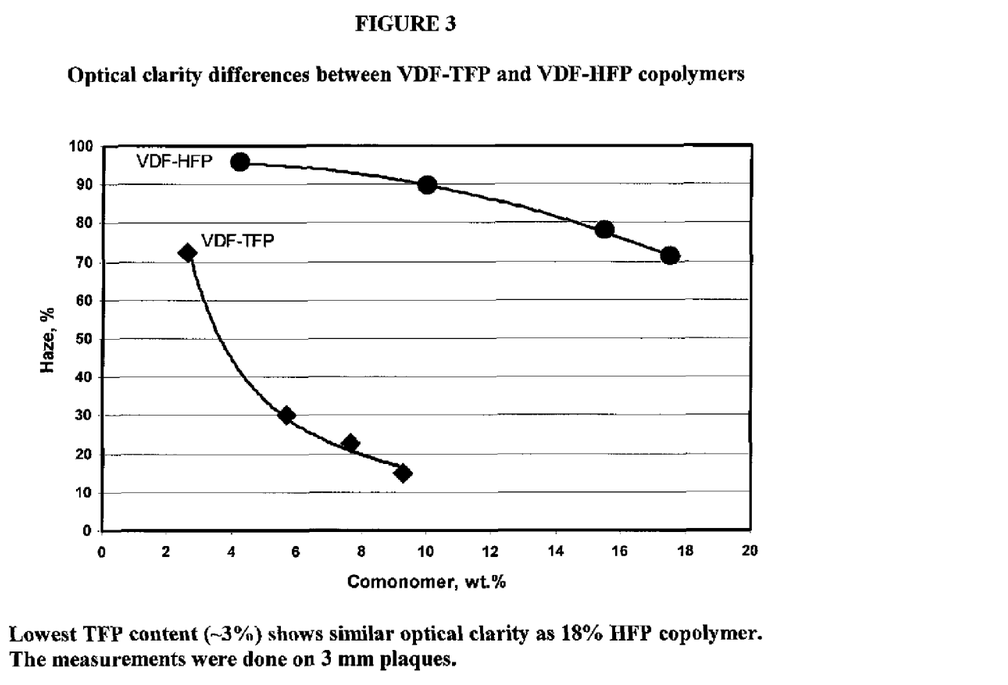
FIG. 3: A plot comparing the optical clarity of VDF-TFP copolymers with VDF-HFP copolymers at differing levels of comonomer.

Copolymers of VDF and TFP were synthesized using the procedure of Example 2, with differing levels of TFP. The optical clarity, as measured by D1003-07 was plotted in comparison to VDF-HFP commercial copolymers, as shown in FIG. 3.

Example 9

Copolymers of VDF and TFP were synthesized using the procedure of Example 6, with differing levels of TFP. The mechanical properties of the samples were compared to VDF-HFP copolymers—which are commercial samples from Arkema Inc. The data are shown in Table 2 below.

TABLE 2

Physical and mechanical properties comparison for VDF-TFP & VDF-HFP copolymers

| Example | Comon. wt. % | Comon. mole % | Melt point degree C. | Tensile Modulus Kpsi | Tensile at yield psi |
|---|---|---|---|---|---|
| 7a | 5.8 | 3.9 | 148.7 | 141500 | 5900 |
| 7b | 7.7 | 5.1 | 152.7 | 122000 | 5720 |
| 7c | 13.7 | 9.6 | 156.3 | 50000 | 2600 |
| 7d | 10 | 4.5 | 144.5 | 119000 | 5490 |
| 7e | 18 | 8.5 | 120 | 56900 | 1630 |

On the molar bases, one can compare (VDF-TFP 7c) with (VDF-HFP7e) and see that VDF-TFP copolymer provides similar mechanical properties at much higher melting temperature (156.3 for VDF-TFP and 120 for VDF-HFP)

Example 10

Figure 4:
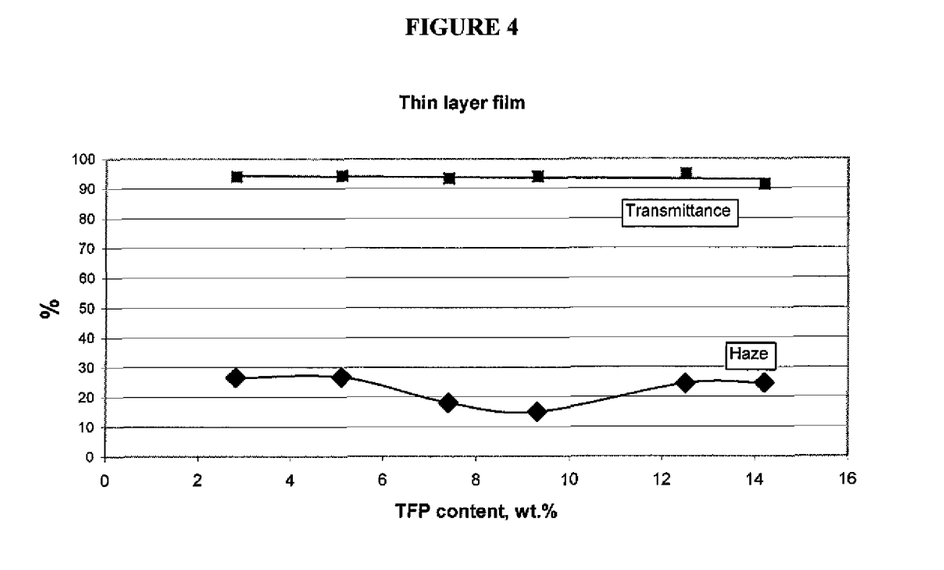
FIG. 4: A plot showing % clarity of VDF-TFP copolymers at differing levels of comonomer.

Copolymers of VDF and TFP were synthesized using the procedure of Example 4, with differing levels of TFP. The optical clarity, and % transmittance were measured by D1003-07, the plot shown in FIG. 4.

Example 11 (Comparative)

A membrane was made from a blend of poly(1-vinylphenyl-2,4-disulfonic acid-co-vinylbenzyl alcohol) polyelectrolyte and KYNAR 2801 (a copolymer of VDF and HFP that contains 10 wt % HFP). The polyelectrolyte was made as described in U.S. application 61/179,128. The polyelectrolyte had a weight average molecular weight of 200 kg/mole and polydispersity of 2.7, as determined by GPC using a mobile phase of water with 0.10 M $NaNO_3$ at 35° C. using universal calibration curve constructed from sulfonated polystyrene standards. The polyelectrolyte contained 78 mole % 1-vinylphenyl-2,4-disulfonic acid and 22 mole % vinylbenzyl alcohol, as determined by proton NMR.

160 g of a 7.12 wt % aqueous polyelectrolyte solution was combined with 27.74 g of 54.8 wt % tetrabutylammonium hydroxide (manufactured by Sachem Inc.). The solution was stirred for approximately 30 minutes and then 102.26 g of 1-methyl-2-pyrrolidinone (Biosynthesis grade solvent manufactured by EMD Chemicals). The water in the solution was removed using a rotary evaporator to produce a polyelectrolyte solution in 1-methyl-2-pyrrolidinone (solution contained 20 wt % polyelectrolyte).

10.95 g of the polyelectrolyte/1-methyl-2-pyrrolidinone solution was combined with 27.16 g of 15 wt % KYNAR 2801/1-methyl-2-pyrrolidinone solution. 0.6631 g of TRIXENE BL7982 and 0.0434 g of FASCAT 4202 was also added to the solution. TRIXENE BL7982 is an isocyanate blocked with 3,5-dimethylpyrazole that is manufactured by Baxenden Chemicals Co. Ltd. FASCAT 4202 is an organotin catalyst manufactured by Arkema Inc. The solution was mixed for approximately 60 minutes using an overhead stirrer to produce a homogeneous solution.

The solution was cast into membrane using a Mathis LTE Labdryer. 2 mil thick aluminum foil with approximate dimensions of 15×12 inches was used as the substrate for casting. Approximately 15 g of polymer solution was spread on the foil and drawn down to a wet film thickness of about 300 micron using a doctor blade. The resulting wet film was then heated 210° C. for 6 minutes. The oven blower was set a 2000 RPM. The dry membranes were then removed from the oven and cooled to room temperature. The thickness of the dried membranes were 25-30 microns.

The membrane was released from the aluminum foil substrate by immersing it in warm deionized water. The membrane was then protonated in 3000 g of 1M aqueous hydrochloric acid. The acid solution was prepared from 18 MΩ deionized water and concentrated hydrochloric acid from EMD Chemicals (OmniTrace grade). The acid bath was heated from ambient to 86° C. over the span of approximately 75 min. The bath was then held in this temperature range for approximately 45 minutes. Subsequently, the membrane was washed in 18 MΩ deionized water and immersed in 3000 g of 1M sulfuric acid. The acid solution was prepared from 18 MΩ deionized water and concentrated sulfuric acid from EMD Chemicals (OmniTrace grade). The acid bath was heated from ambient to 82° C. over the span of approximately 75 min. The bath was then held in this temperature range for approximately 45 minutes. The membranes were removed from the sulfuric acid bath and washed with 18 MΩ deionized water to remove residual acid. The acid-form membrane was then dried at room temperature. The membrane had a peak melting point temperature of 128° C. by DSC.

Example 12

A membrane was made from a blend of poly(1-vinylphenyl-2,4-disulfonic acid-co-vinylbenzyl alcohol) polyelectrolyte and a copolymer of VDF and TFP containing 7.6 wt % TFP. The polyelectrolyte was the same material described in Example 11. The polyelectrolyte/1-methyl-2-pyrrolidinone solution prepared in Example 11 was also used in this example.

10.95 g of the polyelectrolyte/1-methyl-2-pyrrolidinone solution was combined with 27.18 g of 15 wt % VDF/TFP copolymer/1-methyl-2-pyrrolidinone solution. 0.6897 g of TRIXENE BL7982 and 0.0461 g of FASCAT 4202 was also added to the solution. The solution was mixed for 60 minutes using an overhead stirrer to produce a homogeneous solution.

The solution was cast into membrane using the method described in Example 11. The thickness of the dried membranes was 25-30 microns.

The membrane was released from the aluminum foil substrate by immersing it in warm deionized water and it was acidified using the same procedure described in Example 11. The membrane had a peak melting point temperature of 149° C. by DSC.

What is claimed is:

1. A heterogeneous copolymer composition comprising a heterogeneous copolymer having 7 to 10 weight percent of 3,3,3-trifluoropropene (TFP) monomer units and 90 to 93 weight percent of vinylidene fluoride monomer units, wherein said copolymer has a melting point of 150° C. or higher and a crystallinity of less than 23 percent, and wherein said copolymer composition is optically clear, having a haze level of less than 24 percent and a light transmission of greater than 85 percent as measured by ASTM D1003-07 on samples of 35 micron thickness, wherein during the polymerization of the heterogeneous copolymer there is an initial monomer charge wherein the initial monomer charge consists of vinylidene fluoride, and wherein a mixture of vinylidene fluoride and TFP are subsequently delay fed to the polymerization reactor, with all of the TFP being added to the reactor in the delay feed.

2. The copolymer of claim 1, wherein the haze level is less than 10 percent.

3. The copolymer of claim 1, wherein said copolymer is branched, having at least 5% branching.

4. The copolymer of claim 1, wherein said copolymer is branched, having at least 90% light transmission.

5. The copolymer of claim 1, wherein said copolymer contains greater than 75 percent of beta-phase crystals.

6. The copolymer of claim 1, wherein said copolymer contains greater than 50 percent of beta-phase crystals.

7. The copolymer composition of claim 1 in the form of a film.

8. A structure comprising the copolymer of claim 1 wherein said structure is selected from the group consisting of a film as a covering for lenses and other optical equipment; flexible clear tubes; optically clear industrial windows, glasses, pipes, and level indicators; specialty films for solar panels, piezoelectric, and capacitor applications; fuel cell membranes, optically clear coatings, and blown objects.

* * * * *